United States Patent [19]

Mizuguchi et al.

[11] Patent Number: 5,723,082
[45] Date of Patent: Mar. 3, 1998

[54] METHOD OF GRANULATING SYNTHETIC RESIN BY EXTRUSION AND APPARATUS THEREOF

[75] Inventors: Hideki Mizuguchi; Minoru Yoshida, both of Hiroshima, Japan

[73] Assignee: The Japan Steel Works, Ltd., Tokyo, Japan

[21] Appl. No.: 661,614

[22] Filed: Jun. 11, 1996

[30] Foreign Application Priority Data

Jun. 13, 1995 [JP] Japan ................. 7-145865

[51] Int. Cl.[6] .................................................. B29B 9/06
[52] U.S. Cl. ................ 264/142; 264/211.23; 425/67; 425/146; 425/183; 425/311; 425/313; 425/382 R; 425/382.3; 425/463
[58] Field of Search ............................... 264/141–143, 264/211.23; 425/67, 311, 382 R, 463, 183, 313, 382.3, 146

[56] References Cited

U.S. PATENT DOCUMENTS

| | | | |
|---|---|---|---|
| 3,304,578 | 2/1967 | Clute | 425/382 R |
| 4,177,234 | 12/1979 | Lowry | 264/142 |
| 4,217,083 | 8/1980 | Machuque | 425/376.1 |
| 4,395,217 | 7/1983 | Benadi | 425/382 R |
| 4,452,750 | 6/1984 | Handwerk et al. | 264/142 |
| 4,890,996 | 1/1990 | Shimizu | 264/142 |
| 4,984,977 | 1/1991 | Grimminger et al. | 425/382.3 |
| 5,158,730 | 10/1992 | Pawelczyk et al. | 264/142 |
| 5,240,400 | 8/1993 | Fujimoto et al. | 264/142 |
| 5,372,765 | 12/1994 | Chen et al. | 425/382.3 |

FOREIGN PATENT DOCUMENTS 1937862  2/1971  Germany ................. 264/141

Primary Examiner—Jeffery R. Thurlow
Attorney, Agent, or Firm—Sughrue, Mion, Zinn, Macpeak & Seas, PLLC

[57] ABSTRACT

A method of granulating synthetic resin by extrusion and an apparatus thereof by which a large quantity of pellets can be effectively produced is provided. A plurality of sets of granulating sections are connected with an end of an extruder in parallel. The plurality of sets of granulating sections are simultaneously and independently operated for granulation in a normal operation. When one of the sets of granulating sections is stopped, the other set may still operate for granulation.

5 Claims, 2 Drawing Sheets

METHOD OF GRANULATING SYNTHETIC RESIN BY EXTRUSION AND APPARATUS THEREOF

BACKGROUND OF THE INVENTION

1. Field of the Invention

The present invention relates to a method of granulating synthetic resin by extrusion and an apparatus thereof, and more particularly relates to a method of granulating synthetic resin by extrusion and apparatus thereof suitable for an extruder of a large capacity.

2. Background

Conventionally, synthetic resin material is formed into pellets as follows. After synthetic resin has been melted and kneaded by a one-shaft or two-shaft type screw extruder or a two-shaft type mixer, it is sent to one set of granulating sections arranged at an end portion of the extruder and extruded from a die for granulation into warm or cold water in a circulation box. In this case, synthetic resin is extruded while it is formed into string-shapes. Simultaneously with the extrusion, synthetic resin formed into string-shapes is cut off by a rotary knife, which rotates in the front of the die for granulation, to a predetermined length. In this way, pellets of synthetic resin are formed.

Recently, synthetic resin plants are operated on a large scale. In accordance with an increase in the scale of synthetic resin plants, it is required to increase the processing capacity of an apparatus for granulating synthetic resin by extrusion. For example, when polyolefin resin is processed, it is required to provide an apparatus having a capacity of 30 to 100 T/h. When a large quantity of synthetic resin described above is processed by one set of apparatus for granulating synthetic resin by extrusion, the following problems may be encountered.

The apparatus for granulating synthetic resin by extrusion includes an extruder and a granulating section. In order to enhance a capacity of the extruder, it is sufficient to extend a screw diameter arranged in the extruder, or alternatively it is sufficient to increase a rotational speed of the screw. Therefore, no problems are caused in enhancing the capacity of the extruder from the technical viewpoint. However, when the capacity of the granulating section is increased, it is necessary to increase the size of a die for granulation so as to increase the number of nozzle holes formed on the die. When the size of the die for granulation is increased so as to increase the number of nozzle holes, it is technically difficult to obtain a die surface of a large area. The specific problems difficult to be solved are described as follows. It is difficult to machine a surface of high grade material of anti-abrasion and anti-corrosion property, so that it is difficult to obtain a highly accurate flatness; it is difficult to heat the material uniformly so as to prevent a deformation, that is, it is difficult to ensure the flatness; and it is difficult to prevent a deformation of the material when an area of the pressure receiving surface is increased. In order to prevent an increase in the thickness of the die, it is necessary to reduce the extruding pressure. In this case, it is difficult to determine the structure to attain the reduction of extruding pressure. In accordance with the increase in the number of nozzle holes, the weight of the rotary knife and the knife holder is increased. According to the increase in the weight, more electric power is needed to drive the rotary knife. Since the rotary knife of the granulating section is consumable, it is necessary to replace it periodically. In order to replace the rotary knife, it is necessary to temporarily stop the operation of the extruder. Due to the stop of the extruder, the operation rate of the overall plant including the apparatus for granulating synthetic resin by extrusion is lowered, and the quality of granules varies in accordance with the difference of the operating condition. The rotary knife is manually replaced by a worker. When the weight of the rotary knife holder is increased, the replacing work becomes dangerous. When the rotary knife is replaced, the extruder is necessarily stopped and restarted. At this time, resin is wasted, because the resin is not granulated even after it has been extruded from the die. When the capacity of the apparatus for granulating synthetic resin by extrusion is increased, a quantity of the wasted resin is increased. Further, in order to make the quality of granules uniform before and after the stoppage of the apparatus, a larger quantity of resin is wasted.

SUMMARY OF THE INVENTION

The present invention has been accomplished to solve the above problems. It is an object of the present invention to provide a method of granulating synthetic resin by extrusion and an apparatus thereof by which a large quantity of pellets can be effectively produced.

The method of granulating synthetic resin by extrusion of the present invention includes the steps of: connecting a plurality of granulating sections with an end of an extruder in parallel; and operating at least one of the plurality of granulating sections so as to conduct granulation continuously.

The apparatus for granulating synthetic resin by extrusion of the present invention includes a plurality of granulating sections capable of operating individually, arranged at an end of an extruder in parallel.

The above granulating section includes: a resin distributing block arranged at an end of a cylindrical barrel of the extruder, one end of which is communicated with the cylindrical barrel, the other end of which branches into a plurality of resin passage; a gate valve arranged at an end of each branching resin passage; a gear pump connected with the gate valve; a granulating die connected with the gear pump; and an underwater granulating unit connected with the granulating die.

A plurality of granulating sections are connected with an end of the extruder. In a normal operation, the plurality of granulating sections are simultaneously operated for granulation. When one of the granulating sections are stopped, the other granulating sections are operated for granulation, so that the apparatus for granulating synthetic resin by extrusion can be continuously operated.

DETAILED DESCRIPTION OF THE PREFERRED EMBODIMENT

Figure 1:
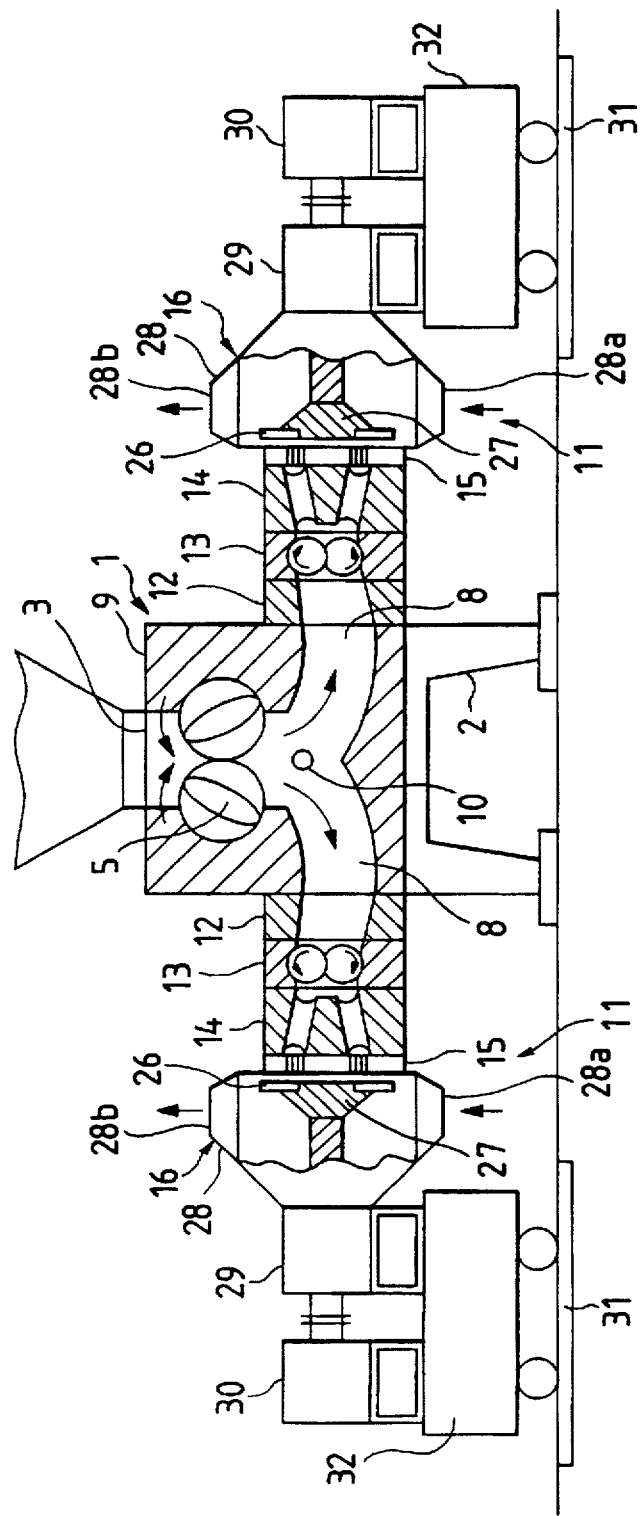
FIG. 1 is a longitudinally cross-sectional front view showing a primary portion of the apparatus for granulating synthetic resin by extrusion of the present invention.
Figure 2:
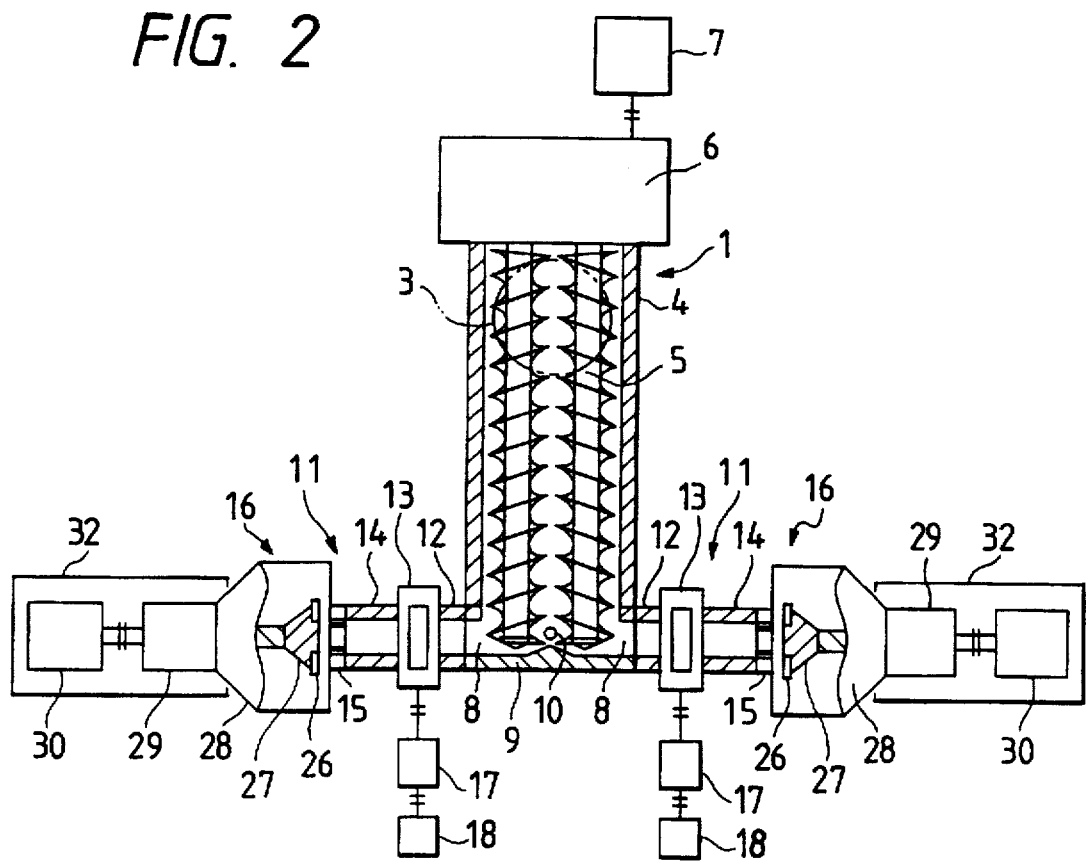
FIG. 2 is a transversely cross-sectional plan view of the primary portion of the apparatus in FIG. 1.

Referring to the accompanying drawings, an embodiment of the present invention will be explained below. FIG. 1 is a longitudinally cross-sectional front view showing a primary portion of the apparatus for granulating synthetic resin by extrusion. FIG. 2 is a transversely cross-sectional plan view of the primary portion of the apparatus in FIG. 1.

In FIGS. 1 and 2, reference numeral 1 is an extruder, which is arranged on a frame 2 and provided with a material supply port 3. In this embodiment, the extruder 1 is a two-shaft type extruder in which the two shafts are rotated in different directions and the screws mounted on the two shafts are not meshed with each other. In an inner hole of the cylindrical barrel 4 of this two-shaft type extruder 1, there are provided two-shaft screws 5. These two-shaft screws 5 are rotated by a drive motor 7 via a reduction gear 6 arranged at the rear of the two-shaft type extruder 1. In this connection, the above two-shaft type extruder is not limited to the specific embodiment. The two shafts may be rotated in either the same direction or the different directions, and the two screws may be meshed or not meshed with each other. End portions of the two-shaft screws 5 may be supported by bearings.

At the end portion of the cylindrical barrel 4, there is provided a resin distributing block 9 having two branching resin passages 8 communicating with the cylindrical barrel 4. At the branching point of the resin passages 8, there is provided a pressure sensor 10.

On the right and left of the resin distributing block 9 in FIG. 1, there are provided two granulating sections 11 which are opposed to each other. Each granulating section includes: a gear pump 13 connected with the branching resin passage 8 of the resin distributing block 9 via a connecting section 12; a granulating die 15 connected with the gear pump 13 via a connecting section 14; and an underwater granulating device 16 connected with the granulating die 15. Individual granulating sections 11 can be independently controlled and operated. The gear pump 13 is driven by the drive motor 18 via a reduction gear 17. Specifically, resin pressure at the end portion of the screw is detected with the pressure sensor 10, and the rotational speed of the gear pump 13 is controlled by the drive motor 18 in accordance with the result of the detection of resin pressure, so that the pressure can be maintained constant at the end portion of the screw.

Figure 3A:
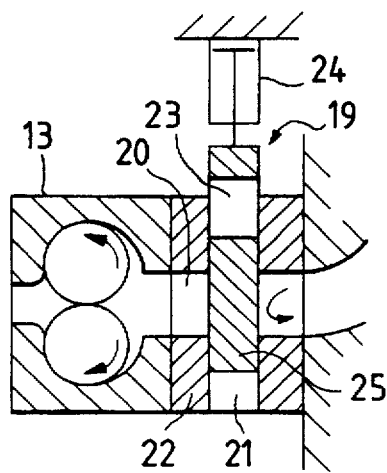
FIG. 3a is a view showing an operating condition of the gate valve, wherein the gate valve is closed.
Figure 3B:
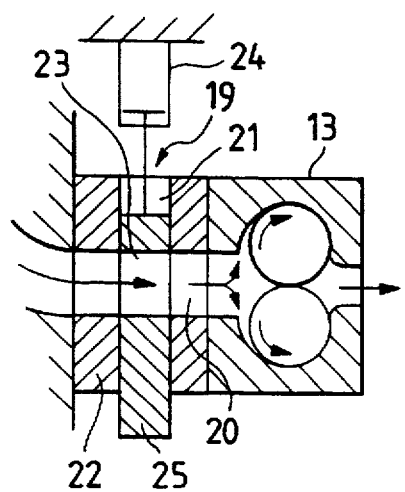
FIG. 3b is a view showing an operating condition of the gate valve, wherein the gate valve is opened.

As shown in FIGS. 3a and 3b, the connecting section 12 may be replaced with a gate valve 19 which includes: a main body 22 having a resin passage 20 at the center and also having an opening portion 21 penetrating in a direction perpendicular to the resin passage 20; and a sliding plate 25 having a resin passage 23 at one end, wherein the sliding plate 25 reciprocates in the opening 21 by the action of a cylinder 24 so that the resin passage 20 can be opened and closed.

The above underwater granulating device 16 includes: a rotary knife holder 27 connected with the granulating die 15, for holding a rotary knife 26; a circulation box 28 having an inlet 28a and an outlet 28b of warm water used for conveying synthetic resin pellets; a drive motor 30 for rotating the rotary knife 26 via a drive section 29; and a carriage 32 for supporting the circulation box 28, drive section 29 and drive motor 30, wherein the carriage 32 reciprocates in a direction perpendicular to the surface of the granulating die 15.

The capacity of each granulating section 11 is designed to be smaller than the capacity of the two-shaft type extruder 1. When the granulating section 11 is composed of two systems, it is preferable that the capacity of each granulating section 11 is approximately 50% of the capacity of the two-shaft type extruder 1.

Next, the operation of the above embodiment will be explained below. First, a normal operating condition of the apparatus of granulating synthetic resin by extrusion will be explained as follows.

Synthetic resin material is supplied from the material supply port 3 into the cylindrical barrel 4 of the two-shaft type extruder 1. Then the synthetic resin material is melted and kneaded by the two-shaft screw 5 and sent to an end portion of the screw. Resin pressure at the end portion of the screw is detected by the pressure sensor 10 and maintained at a predetermined value when the rotational speed of the gear pump 13 is controlled by the drive motor 18. In this connection, the resin pressure at the end portion of the screw is usually controlled to be a value of 0 to 15 kg/cm$^2$. Both the granulating sections 11 are driven under the same operating condition so that the synthetic resin melted by the two-shaft type extruder 1 can be equally distributed to the two resin passages 8 by the resin distributing block 9, that is, 50% of the synthetic resin is sent to one of the resin passages 8 and the remaining 50% of the synthetic resin is sent to the other passage 8.

In the granulating section 11, the pressure of melted resin is increased by the gear pump 13. Then the melted resin is extruded from the granulating die 15 into warm water or cold water accommodated in the circulation box 28, so that the melted resin is formed into string-shapes. At the same time, the string-shaped resin is cut off to a predetermined size by the rotary knife 26 rotating in the front of the granulating die 15. In this way, synthetic resin pellets are provided.

When the overall apparatus of granulating synthetic resin by extrusion is started from a stop condition, the operation is conducted as follows. The two-shaft screws 5 of the two-shaft type extruder 1 are rotated by the drive motor 7, so that the synthetic resin material is supplied. The gear pump 13 of one of the granulating sections 11 is started by the drive motor 18, so that the melted resin sent from the two-shaft type extruder 1 is extruded from the granulating die 15, and the rotary knife 26 is rotated in warm water. In this way, the granulating operation is started. After that, the other granulating section 11 is started by the same procedure, and the granulating operation is started. In this way, the apparatus gets into the normal operation explained before.

When one of the granulating sections 11 is stopped for replacing the rotary knife 26, the rotational speed of the two-shaft type extruder 1 is reduced, so that a quantity of extruded resin is reduced to half, and only the other granulating section 11 is operated. Also in this case, the resin pressure at the end portion of the screw is detected by the pressure sensor 10 and usually controlled to the pressure of 0 to 15 kg/cm$^2$. Due to the foregoing operation, the two-shaft type extruder 1 can be continuously operated at all times.

In the granulating section 11 which has been stopped, when synthetic resin of low viscosity is used, or when the resin pressure at the end portion of the screw is high, the melted resin leaks from a gap in the stopped gear pump 13 and reaches the granulating die 15. Then the resin is extruded from the granulating die 15. However, when the resin passage 20 is closed by the gate valve 19 as shown in FIG. 3a, the leakage of resin can be completely stopped. In this connection, FIG. 3b is a view showing a condition in which the resin passage 20 is opened by the gate valve 19 and the melted resin is supplied to the granulating section 11.

As shown in FIGS. 1 and 2, in the two-shaft type extruder, in which the two shafts are rotated in the different directions, the granulating sections 11 are arranged on the right and left at the end portion of the extruder 1. When the two granulating sections 11 are operated in a steady condition in the above arrangement, the synthetic resin, which has been melted by the extruder 1, is smoothly extruded from the end portions of the two-shaft screws 5 to the resin distributing block 9. Then the resin flows along the resin passage 8 and reaches the respective granulating sections 11. Accordingly, when the melted resin is extruded from the extruder 1 to the resin distributing block 9, it is not stopped, so that the quality is not deteriorated, that is, there is no possibility that a portion of the melted resin is subjected to the repetition of shearing action. Therefore, the fluctuation of temperature is not caused, that is, the fluctuation of resin quality is not caused.

In the above embodiment, the two-shaft type extruder 1 is adopted. However, it should be noted that the present invention is not limited to the specific extruder. For example, a one-shaft type screw extruder or a two-shaft type mixer may be adopted. In the above embodiment, the two systems of the granulating sections 11 are connected with the extruder 1, however, not less than two systems of the granulating sections 11 may be connected with the extruder 1 as long as the capacity of the extruder 1 is sufficiently large. In this connection, even in the extruder 1 of a small capacity, two systems of the granulating sections 11, the capacity of each granulating section is the same as the capacity of the extruder 1, may be arranged in parallel with each other. When the two systems of the granulating sections 11 are arranged as described above, one of the two systems can be operated while the other system is stopped. That is, one of the two systems may be alternately operated. In this way, the apparatus can be continuously operated.

The granulating device of the granulating section 11 is not limited to the underwater type granulating device, but a strand type granulating device or an air granulating device may be adopted.

Due to the foregoing arrangement of the present invention, the following effects can be provided.

(1) Since the capacity of the granulating section is smaller than the capacity of the extruder, the size of the granulating section can be reduced to be smaller. Since the granulating section can be made compact in this way, no problems occur in the design and manufacture of the granulating section.

(2) Since a plurality of granulating sections are arranged, the size of each granulating section can be reduced. Therefore, the operating property of the granulating section can be improved, and its operation and maintenance can be safely conducted.

(3) Even if one of the granulating sections is stopped, the other granulating section is continuously operated, so that the extruder can be operated at all times. Accordingly, it is possible to prevent a large quantity of resin from being wasted when the extruder is stopped and restarted. Since the extruder is not stopped, the fluctuation of resin quality can be prevented, and further the rate of operation of the overall apparatus for granulating synthetic resin by extrusion can be enhanced.

(4) Since a plurality of granulating sections are arranged, the capacity can be enhanced to 30 to 100 T/H which is difficult to attain by a conventional apparatus for granulating synthetic resin by extrusion.

(5) Since the granulating section is connected with the extruder via the gate valve, leakage of resin from the granulating section can be prevented when it is stopped. Even when the gear pump is out of order, it can be easily disassembled and repaired.

What is claimed is:

1. A method of granulating synthetic resin by extrusion, said method comprising the steps:

extruding a resin material through an extruder;

passing at least a portion of the extruded resin material to a first granulator which is connected to one end of the extruder for receiving the resin material;

granulating in the first granulator the resin material passed thereto from an output of the extruder;

passing at least a portion of the extruded resin material to at least a second granulator which is connected to the one end of the extruder in parallel with the first granulator for receiving the resin material;

granulating in at least the second granulator a portion of the resin material passed thereto from the output of the extruder; and passing the resin material to at least one of said first granulator and second granulators so that at least one of the granulators is operated to conduct granulation continuously.

2. An apparatus for granulating synthetic resin by extrusion, said apparatus comprising:

an extruder;

a plurality of granulators individually arranged in parallel at an end of said extruder; and a drive means for driving each of said granulators independently.

3. The apparatus for granulating synthetic resin by extrusion of claim 2, wherein said extruder includes a cylindrical barrel, and a resin distributing block arranged at the end thereof, a first end of said resin distributing block is communicated with said cylindrical barrel, a second end of said resin distributing block branches into a plurality of resin passages.

4. The apparatus for granulating synthetic resin by extrusion of claim 3, wherein each of said granulators includes a gate valve arranged at an end of each of said resin passages, a gear pump connected with said gate valve, a granulating die connected with said gear pump, and an underwater granulating unit connected with said granulating die.

5. A method of continuously granulating synthetic resin by extrusion, said method comprising the steps of:

continuously operating a part of an apparatus without stopping a whole of the apparatus wherein said apparatus includes a plurality of granulators connected with an end of an extruder in parallel.

* * * * *